Dec. 2, 1958    H. A. JOHANESEN    2,862,512
GASEOUS FUEL IMPROVING AND SAVING DEVICE FOR
INTERNAL COMBUSTION ENGINES
Filed Dec. 24, 1956
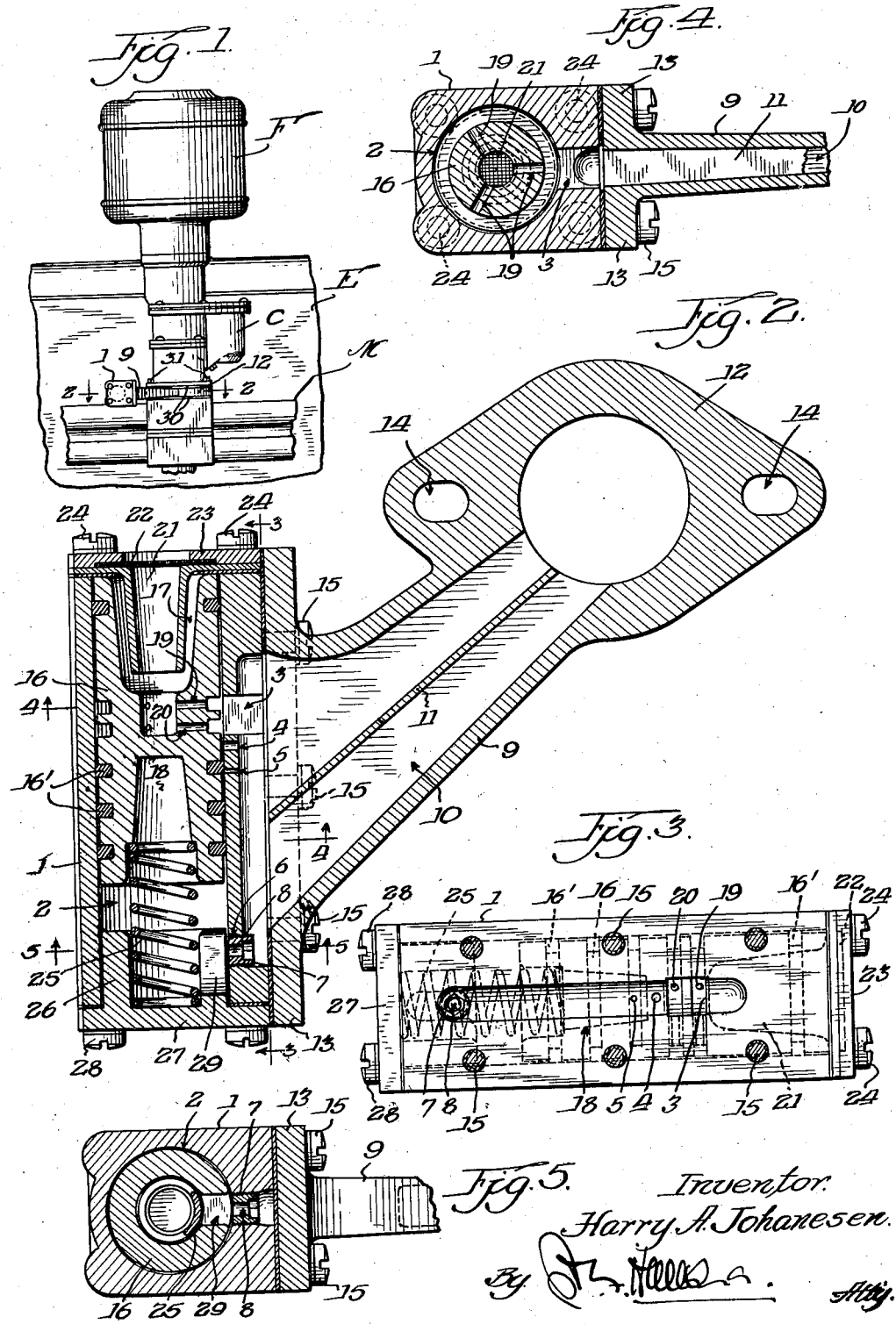
Inventor:
Harry A. Johanesen.

United States Patent Office 2,862,512
Patented Dec. 2, 1958

2,862,512

GASEOUS FUEL IMPROVING AND SAVING DEVICE FOR INTERNAL COMBUSTION ENGINES

Harry A. Johanesen, Chicago, Ill.

Application December 24, 1956, Serial No. 630,099

4 Claims. (Cl. 137—98)

This invention relates to improvements in gaseous fuel saving devices particularly advantageous and beneficial for usage in conjunction with those types of carburetors (single or multiple barrel) employed to form and deliver combustible fuel charges to the firing chambers of the cylinders of internal combustion engines.

It is an object of the invention to provide a device of the above indicated character utilizing in its construction and operation mechanical means which are responsive to the engine created fuel intake suction or partial vacuum in such a manner as will effect material economies in engine fuel consumption to the extent that the gaseous fuel or carbureted charged to be delivered from the carburetor to the engine intake manifold will be leaned and yet improved as to its degree of combustibility as and when the intake manifold throttle valve is opened or partially opened, or when said valve is closed to a degree permitting of so called idling operation of the engine.

It is also an object of the invention to provide a fuel economizer for internal combustion engines which will operate to produce a substantially entirely consumable combustional charge, and so eliminate gaseous tailings which when drained from the engine cylinders into its crankcase result in highly detrimental dilution of the lubricating oil therein contained and furthermore, prevent carbon deposits on the cylinder walls and those sides of the cylinder valves exposed to their combustion or firing chambers.

Another and equally important object of the invention resides in the provision of a suction actuated valve, the same being operable to be automatically responsive to the degree of suction applied thereto from the engine intake manifold whereby to selectively modulate the carbureted fuel charge on the posterior side of the carburetor.

A further object of the invention is to provide a device, by means of which, a carbureted combustible fuel effected by an internal combustion engine carburetor will be materially improved as to combustibility prior to its introduction into the engine cylinders, such being accomplished by the automatic control of air flow to and admixture with said carbureted fuel and dependent upon the degree of fuel intake suction effected in the intake manifold during operation of the engine.

Other objects will be in part obvious and in part pointed out hereinafter.

The foregoing, as well as other objects, advantages and meritorious teachings of my invention, will be in part obvious and in part pointed out in the following described disclosure thereof, when taken in conjunction with the accompanying drawings, it being understood that the form of invention presented herein is precise and what is now considered to be the better mode of embodying its principles, but that other and further modifications and changes may be made in specific embodiments without departing from its essential features.

In the drawings:

Figure 1 is an elevation showing my invention operatively installed between the carburetor and intake manifold of an internal combustion engine.

Figure 2 is an enlarged horizontal section taken on the line 2—2 of Figure 1 looking in the direction in which the arrows point.

Figure 3 is a section taken on the line 3—3 of Figure 2 in the direction indicated by the arrows.

Figure 4 is a section taken on the line 4—4 of Figure 2 looking in the direction in which the arrows point, and, Figure 5 is a similar section but taken on the line 5—5 of Figure 2 in the direction indicated by the arrows.

Referring in detail to the drawings, Figure 1 shows the invention applied to an internal combustion engine of the type used in automobiles, wherein said engine is fragmentally illustrated and designated by the reference letter E; the intake manifold by M; the carburetor by C, and an air filter by F.

The invention, in the herein illustrated embodiment, consists of a body 1 having a cylindrical bore 2 opening onto its opposite ends. At least one outer side wall of the body is flat and has longitudinally disposed and relatively spaced ports and/or ways 3, 4, 5 and 6, hereinafter more fully described, formed therein. The way 6 is screw threaded and receives therein a bushing or sleeve 7. A port 8 is formed in and through the bushing. The size of this port may be changed by substituting bushings.

To immovably though detachably support the body 1 in cooperative relationship to the carburetor C and intake manifold M an arm, indicated at 9, is provided. Said arm has a way 10 in and longitudinally through the same opening onto its opposite ends and is preferably divided by a longitudinally disposed sectional wall 11. One end of the arm has a flanged flat ported plate 12 thereon communicating with the adjacent end of the way 10, while its remaining end is provided with a relatively angularly arranged flat attaching plate 13 onto which the remaining end of said way opens. The flanges of the plate 12 have bolt receiving openings 14 therethrough and the side portions of the plate 13 have appropriate openings therethrough adapted to receive screws 15 threadedly engaged in adjacent portions of the aforesaid flat side of the body 1. Thus, the plate 13 and the adjacent end of the arm 9 overlie the flat and ported side of the body 1, as shown in Figure 2.

Slideable within the bore 2 of the body 1 is a piston 16 carrying suitable peripheral rings 16'. The length of said piston is less than that of the cylinder bore and it is adapted to slide therein. Separate and coaxially disposed and aligned pockets 17 and 18 are formed in and open onto the opposite end portions of the pistons.

The inner end portion of the pocket 17 may be and preferably is of a reduced diameter with relatively parallel side walls. Longitudinally spaced sets of radially disposed ducts 19 and 20 are formed in the piston 16 laterally of the reduced inner end of the pocket 17, opening into circumferentially extending ways formed in the piston and into said pocket reduced end. The diameters of the ducts 19 may be less than those of the ducts 20. Furthermore, the spacing between these sets of ducts corresponds to the spacing between the longitudinally disposed cylinder wall ports 4 and 5, while the size of the port 3 is such that the ducts 19 and 20, under certain conditions of operation, will be collectively registered therewith. Of course, with sliding movement of the piston in one direction the extent of registration of the ducts with the port 3 will be selectively modulated.

The ports 3, 4 and 5 in the cylinder flat wall function to pass air through and from the ducts 19 and 20 in the piston 16 and from the cylinder into the way 10 of the arm 9 from which it is discharged via the port of the plate fitting 12 into the intake manifold M beyond the carburetor C.

The port 3 being larger than the ports 4 and 5 is characterized as a volume port, outletting or supplying the greatest volume of air to said way 10 for an optimum of combustible charge admixture.

The port 4, nearer the volume port, is of less size than said volume port, while the port 5 is of a size less than the port 4. In consequence, it will be seen that whereas the port 3 passes a maximum flow of air from the cylinder, the port 5 passes a minimum flow, and that the port 4 passes a flow whose volume is between that from the ports 3 and 5, to wit, an intermediate air flow or supply stage. Hence, an automatically modulated or metered flow of air from the cylinder responsive to the degree of suction applied to the piston 16 will be effected.

In order that an accelerated flow of air from without the device into the same and the air intake end of the piston 16, i. e., into the pocket 17 and its duct communicating extension may be effected, an inwardly tapered nozzle or jet 21 is nestingly or telescopically received within said pocket in the manner shown in Figure 2 of the drawings with its inner and smaller open end discharging directly into the pocket extension and its outer and larger end communicating with the atmosphere. A screen 22 is seated on the nozzle outer end and both are immovably secured by a ported end wall 23 seated thereover and on the adjacent end of the cylinder 1. Screws 24 are engaged through the end wall and in threaded openings in portions of the cylinder end.

An expansible coiled spring 25 has its inner end seated in the remaining coaxially disposed pocket 18 in the piston 16. The outer end thereof is seated in the cup-like portion 26 on the inner side wall of an end plate 27 engaged over the remaining and adjacent open end of the cylinder 1 and secured thereto by screws 28.

It should be here noted that the cup-like portion 26 on the inner side of the end plate 27 is slotted or open, as at 29 and that this slot communicates with the port 8 of the hereinbefore described bushing 7; moreover, that said port 8 of the bushing 7 is disposed outwardly of or beyond the adjacent end of the slideable piston 16 and the inner end of the cup-like portion 26.

The tension of the above described coiled spring 25 is predetermined and is such that it will impart thrust to the piston 16, normally urging it to the opposite end of the bore 2 of the cylinder 1 as is shown in Figure 2 of the drawings.

In usage of the device of the invention, it is installed between the posterior side of the carburetor C and the normally adjacent end of the intake manifold M by placing the flanged ported plate of the arm 9 flatly adjacent the same, preferably faced with suitable gaskets 30 and then securely interconnecting the assembly by bolts 31 engaged through the openings 14 in said ported plate and through similar openings formed in the usual carburetor and manifold fittings.

With firing and operation of the equipped engine and assuming that it is operating at idling speed with the throttle valve (not shown) in its "closed" position, a maximum of engine cylinder and intake manifold suction will be created. This suction will be effected in the way 10 in the arm 9 and, through the port 8 of the bushing 7, transmitted to and into the adjacent end of the cylinder bore 2. Being thus effected in said cylinder bore, the piston 16 will be "pulled" and caused to move in the bore toward the bushing 7 provided end thereof against the tension of the coiled spring 25. It will move from the position shown in Figure 2 of the accompanying drawings to the limit of its path of travel in said bore where it may contact the adjacent end of the cup-like portion 26 on the inner side of the end plate 27. In such position, the ducts 19 and 20 will be closed in that they will be disaligned with the air volume intermediate air stage and minimum air stage ports 3, 4 and 5, respectively, in the cylinder wall. Consequently, passage of air from the cylinder into the way 10 of the arm 9 and into the intake manifold M will be prevented.

As and when the throttle valve is partially opened or "cracked," the degree of engine created suction applied to the piston 16 within the cylinder 1 will be decreased. Thereupon, the expansible coiled spring 25 will act upon the piston 16 to move it through the cylinder bore in a direction toward the nozzle or jet 21 which, as will be borne in mind, is engaged in the piston pocket 17. Such sliding movement of the piston 16 will be responsive to the degree of the applied suction. Hence, if the suction is of a material degree, the piston will be moved to a position within the cylinder bore where the minimum air ducts 19 align with the minimum port 5 in the cylinder wall, permitting the minimum passage of air into and through said ducts 19 and minimum air port 5 into and through the way 10 of the arm 9 for delivery into the intake manifold M. Being thus delivered, this minimum metered supply of air will be admixed with the carburetor delivered combustible charge for improving the same in the manner hereinbefore described.

As or should the engine created suction diminish, so too will its "pull" effect on the piston 16 diminish, permitting the coiled spring 25 to further move said piston 16 in the cylinder bore toward the jet nozzle 21. Thereupon, the intermediate stage of air supply will be effected in that the ducts 19 and 20 will be registered with the ports 4 and 5 in the cylinder wall, permitting an increased supply of air to and into the way 10 of the arm 9 for delivery into the intake manifold M and admixture with the carbureted charge supplied thereto from the carburetor C.

With further reduction of the engine created manifold suction, the coiled spring 25 within the cylinder 1 will impart further sliding movement to the piston 16 in the direction above indicated. Thereby, the two sets of radially disposed ducts 19 and 20 will be registered or partially registered with the volume air port 3 in the cylinder wall, hence, effecting an automatically proportioned supply of air to and into the way 10 of the arm 9 for delivery into the engine intake manifold M and admixture with the carbureted charge therein.

From the foregoing, it will be understood that the piston 16 working within the bore 2 of the cylinder 1 of the device of the invention is responsive to the degree of suction applied thereto via the way 10 of the arm 9 from the equipped engine. Because of such responsiveness, it will be seen that said piston will operate to automatically modulate or regulate the volume of air through the same via the screen 22, the jet nozzle 21 and the ducts 19 and 20, and in so doing, will accurately and beneficially proportion the supply of the air to and with the carbureted charge in the engine intake manifold M whereby to materially improve its combustibility and to effect a maximum economy of fuel consumption.

I claim:

1. A device for proportioning and delivering additional air to carbureted fuel comprising in combination with an internal combustion engine intake manifold and a carburetor communicating therewith, an arm internally channeled throughout its length, a ported fitting on one end thereof communicating with the adjacent end of the channel, said fitting being interposed between and communicating with the carbureted fuel delivery end of the carburetor and the intake manifold, a cylinder on the remaining end of said arm a side wall of which has longitudinally disposed and spaced ports therein communicating with the cylinder interior and the remaining end of said channel, certain of said ports being located to one side of the transverse axis of the cylinder and graduated in size, and another located to the opposite side of the transverse axis, a piston slideable in the cylinder having separate and coaxially disposed pockets therein opening, respectively, onto its opposite ends, said piston having longitudinally spaced circumferentially extending ways and communicating radially disposed ducts therein, the ducts opening into the inner end portion of one of said pockets whereby with sliding of said piston in the cylinder the ways therein will selectively communicate with said certain ports to regulate the volume of air flow through the ducts and ways and ports into and through the internally channeled arm to the carburetor, airflow accelerating means mounted in one end of the cylinder communicating with the last mentioned pocket, a wall having air passage opening therethrough on that end of the body in proximity to the airflow accelerating means, other means in the cylinder engaged in the remaining piston pocket and with the piston urging sliding movement of the piston in one direction in the cylinder whereby to normally register said ducts with certain of said graduated ports, and a second wall on the remaining end of the cylinder closing the same.

2. A device for proportioning and delivering additional air to carbureted fuel comprising in combination with an internal combustion engine intake manifold and a carburetor communicating therewith, an arm internally channeled throughout its length, a ported fitting on one end thereof communicating with the adjacent end of the channel, said fitting being interposed between and communicating with the carbureted fuel delivery end of the carburetor and the intake manifold, a cylinder on the remaining end of said arm, one wall of the cylinder having longitudinally disposed and relatively spaced ports therein communicating with the cylinder interior and the remaining end of said channel, certain of said ports being located to one side of the transverse axis of the cylinder and graduated in size, and another located to the opposite side of the transverse axis in constant communication with said channel, a piston slideable in the cylinder having separate and coaxially disposed pockets therein opening, respectively, onto its opposite ends, said piston having longitudinally spaced ways formed therein communicating with the inner end portion of one of said pockets and opening onto its outer surface, said ways and said certain ports being correspondingly spaced whereby with sliding of said piston in the cylinder the ways therein will selectively communicate with said certain ports to regulate the volume of air flow through the ways and ports into and through the internally channelled arm to the carburetor, airflow accelerating means mounted in one end of the cylinder directed into the last mentioned pocket, a wall having an air passage way therethrough on that end of the cylinder adjacent said airflow accelerating means, an expansible coiled spring within the cylinder engaged in the remaining piston pocket and with the piston, and a second wall on the remaining end of the cylinder closing the same, and said expansible coiled spring having bearing engagement with said second wall.

3. In combination with the intake manifold of an internal combustion engine and a carburetor communicating therewith, a fuel economizing and improving device for proportioning and delivering additional air to carbureted fuel delivered from the carburetor, comprising an arm having a longitudinal way in and through the same, a ported fitting on one end of the arm the port of which communicates with the adjacent end of said way, said ported fitting being interposed between and communicating with the carbureted fuel delivery end of the carburetor and the intake manifold and connected thereto, a body carried by the remaining end of said arm having a longitudinal bore therein, one side wall of the body having longitudinally disposed and relatively spaced ports therein opening into the remaining end of the way in and through the arm and into the body bore, certain of which are located to one side of the transverse axis of said body and are graduated in size, and another to the opposite side of said transverse axis, a piston slideable in the body bore having separate and coaxially disposed pockets in the opposite end portions thereof opening, respectively, onto its opposite ends, a portion of the piston having separate circumferential ways and communicating radially disposed ducts therein opening into the inner end of one of said pockets and outwardly into the adjacent circumferential ways, said ducts and said certain ports being correspondingly spaced whereby with sliding of said piston in the body the ways therein will selectively communicate with said certain ports to regulate the volume of air flow through the ways and ports into and through the internally channelled arm to the carburetor, a jet nozzle fixedly mounted in one end of the body bore opening into the duct provided piston pocket, a wall having an air passageway therethrough on that end of the body adjacent the jet nozzle and communicating therewith, spring means in the body bore engaged in the remaining piston pocket and with the piston urging sliding movement of said piston in one direction in the body bore whereby to normally register said ducts with certain of said graduated ports, and a second wall on the remaining end of the body closing the adjacent end of said bore and having said spring means in bearing engagement therewith.

4. A device for proportioning and delivering additional air to carbureted fuel, comprising in combination with an internal combustion engine intake manifold and a carburetor communicating therewith, an arm internally channeled throughout its length, a ported fitting on one end of the arm communicating with the adjacent end of the channel, said fitting being interposed between and communicating with the carbureted fuel delivery end of the carburetor and the intake manifold, a housing on the remaining end of said arm, one wall of the housing having longitudinally disposed and relatively spaced ports therein communicating with the housing interior and the remaining end of said channel, certain of said ports being located to one side of the transverse axis of the housing and graduated in size, and another of the ports being located to the opopsite side of said transverse axis in constant communication with said channel, a piston slidable in the housing having separate and coaxially disposed inwardly tapered pockets therein opening, respectively, onto its opposite ends, one of said pockets having a cross-sectionally area reduced inner end portion, a portion of the piston adjacent said one pocket having longitudinally spaced ways therein opening into said area reduced inner end portion of the one pocket and onto the outer surface of the piston, said ways and said certain ports being correspondingly spaced whereby with sliding of said piston in the housing the ways therein will selectively communicate with said certain ports to regulate the volume of air flow through the ways and ports into and through the internally channelled arm to the carburetor, airflow accelerating means mounted in one end of the housing dischargable into said one pocket, the adjacent end of the housing having air inlet means therein communicating with said accelerating means, and means within the housing engaged in the remaining pocket and with the piston for imparting constant urge of inward travel thereof within said housing.

References Cited in the file of this patent

UNITED STATES PATENTS

| | | |
|---|---|---|
| 2,207,152 | Huber | July 9, 1940 |
| 2,323,639 | Anderson | July 6, 1943 |
| 2,549,897 | Evrell | Apr. 24, 1951 |